Aug. 23, 1966    YUKIO TANAKA    3,268,794
INTERMEDIATE-FREQUENCY ELECTRIC POWER GENERATING APPARATUS
Filed Feb. 2, 1962
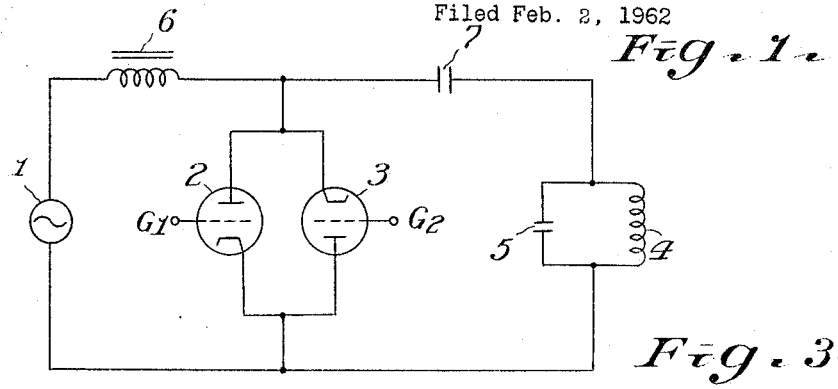
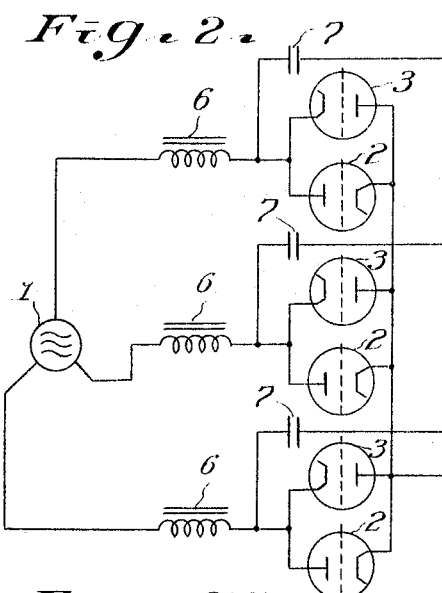
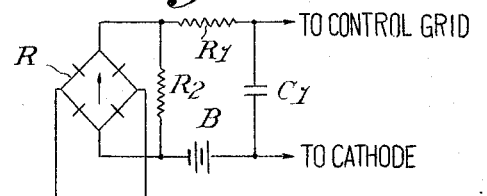
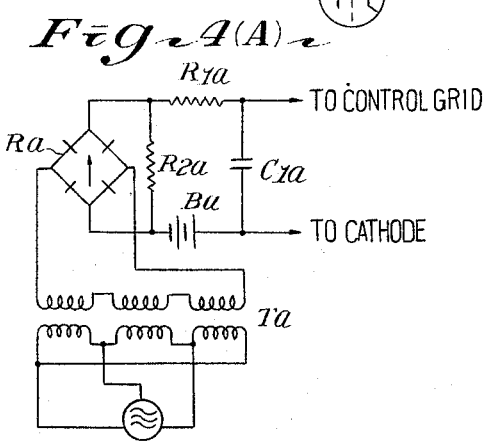
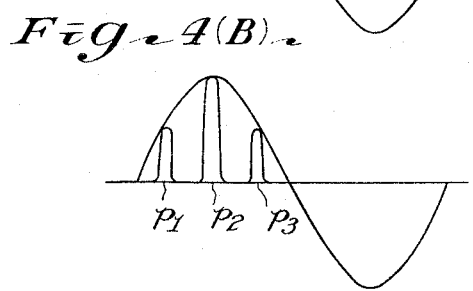

United States Patent Office 3,268,794
Patented August 23, 1966

1

3,268,794
INTERMEDIATE-FREQUENCY ELECTRIC POWER GENERATING APPARATUS
Yukio Tanaka, Setagaya-ku, Tokyo-to, Japan, assignor to Kokusai Denki Kabushiki Kaisha, Tokyo-to, Japan, a joint-stock company of Japan
Filed Feb. 2, 1962, Ser. No. 170,565
Claims priority, application Japan, Feb. 6, 1961, 36/3,464
2 Claims. (Cl. 321—66)

This invention relates to a new apparatus for generating electric power of intermediate frequency from several hundreds to several thousands of cycles per second through the utilization of rectifying devices with control grids and a parallel resonance circuit.

It is an object of this invention to provide a new intermediate-frequency electric power generating apparatus which has a simple construction, and which can be operated with extremely high stability for a high power without possibility of arc back.

The foregoing objects and other objects and advantages as will become apparent hereinafter have been achieved by the present invention, which, briefly described in general terms, has the following features. In the apparatus of this invention, rectifiers provided with control grids which are connected in mutually reverse parallel connection to an alternating-current power source by way of a retardation coil, and a parallel resonance circuit is further connected in parallel to these rectifiers by way of a coupling condenser. Then, in causing intermediate-frequency power to be generated by the alternate passage of current through the rectifiers, arc backing is prevented, and stable operation is accomplished, by simultaneously impressing positive control pulse voltages which are necessary for passing current as control voltages of the rectifiers.

The details of the invention as well as the manner in which the objects of the invention may best be achieved will be more clearly apparent by reference to the following description when taken in conjunction with the accompanying illustrations in which like parts are designated by like reference numerals, and in which:

FIG. 1 is an electrical connection diagram indicating one embodiment for the purpose of describing the principle of this invention;

FIG. 2 is an electrical connection diagram indicating the application of this invention to a three-phase power source;

FIG. 3(A) is an electrical circuit diagram indicating one example of a control pulse voltage generating circuit suitable for use with the embodiment of FIG. 1;

FIG. 3(B) is a wave form diagram showing the pulse wave form produced by the circuit of FIG. 3(A);

FIG. 4(A) is an electrical circuit diagram indicating one example of a control pulse voltage generating circuit suitable for use with the embodiment of FIG. 1; and FIG. 4(B) is a wave form diagram showing the pulse wave form produced by the circuit of FIG. 4(A).

The schematic shown in FIG. 1 is for describing the principle of this invention comprises an alternating power source 1, for example, a commercial frequency power source; rectifiers 2 and 3 which are provided, respectively, with control grids $G_1$ and $G_2$, for example, discharge tubes such as thyratrons or ignitrons, which are reversely connected, a parallel resonance circuit formed by a coil 4 and a capacitor 5; a retardation coil 6 for suppressing the flowing of any intermediate-frequency current generated by the apparatus into the power source 1; and a coupling condenser 7 for preventing the short circuiting of the power source 1 at the coil 4; the above components being connected as shown in FIG. 1.

Positive, pulse voltages necessary for ignition, as indicated in FIG. 3(B), are impressed simultaneously on the control grids $G_1$ and $G_2$ of the discharge tubes 2 and 3, respectively. If now, when the anode of the discharge tube 2 is under the positive potential of the alternating-current power source, a positive, repeated pulse voltage as indicated in FIG. 3(B) is impressed on the grid $G_1$ from the generating circuit, the discharge tube 2 will ignite, and a current due to the altenating voltage will flow into the following closed loop.

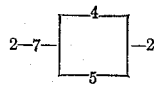

Accordingly, an oscillation current of frequency $fo$ determined by the coil 4 and capacitor 5 will be generated. However, this oscillation current will circulate also in the following closed loop.

2—7—4—2

In this case, furthermore, since an ignition voltage which is the same as that in the case of the control grid $G_1$ is being simultaneously impressed also on the control grid $G_2$, the discharge tube 3 accomplishes the function of by-passing the intermediate-frequency current of frequency $fo$. Consequently, it is possible to prevent arc back of the discharge tube 2.

This current-flowing condition automatically disappears when the voltage of the power source 1 becomes zero, but when the next half cycle begins, the discharge tube 3 first ignites. In this case, the tube 2 operates as a by-pass of the tube 3 with respect to the intermediate-frequency current. That is, the generation and decay of the aforesaid intermediate-frequency current are repeated for each half cycle of the power source frequency, but the operations of the discharge tubes 2 and 3 also take place alternately as by-pass operations with respect to the intermediate-frequency current. Accordingly, arc back of the discharge tubes can be effectively prevented, and the apparatus can be made to accomplish extremely stable operation for a high power.

Since, as is apparent from the illustration, the power source 1 is connected, in parallel, to the intermediate-frequency power generation circuit, it will be obvious that, for practical purposes, the operation can be carried out without difficulty by means of the retardation coil 6, for suppressing intermediate-frequency current, and the coupling condenser 7. The retardation coil 6 is a choke coil which has a low inductance for normal commercial frequencies of the power source 1, but shows a large inductance for the intermediate frequency produced by the oscillation circuit or loop. Accordingly the coil effectively suppresses the following of oscillation current through the source 1. If the capacitor 7 is not in the circuit the power source 1 will be short circuited through the inductance 4 of the oscillation circuit. However, the use of the capacitor 7 cuts-off short-circuiting current since the capacitor 7 shows an extremely large impedance at commercial frequencies of the power source 1. Moreover, the coil 6 precludes short-circuiting of the power source 1 and in its absence the apparatus would not function as desired.

Moreover, although the frequency is of the order of from 150 c./sec. to 10 kc. because of the limits imposed by the ion decay time of the presently existing thyratrons, it will become possible to generate even higher frequencies such as ultrasonic sound frequencies with improvements in discharge tubes.

In the case of the apparatus described above, an oscillation current is generated only once during a half-cycle interval of the alternating-current power source. It is possible to generate an oscillation current even more effectively by utilizing several ignition pulses $P_1$, $P_2$ and $P_3$ such as indicated in FIG. 4(B) and produced from a pulse generator such as, for example, that shown in FIG. 4(A) and, by means of said pulses, causing a plurality of ignitions to be produced during a half-cycle interval of the alternating-current power source.

In this case, however, it is necessary to select an ample large value of impedance for the retardation coil 6 and cause the voltage drop of the coil 6 to be amply large at the time of ignition of a discharge tube, the power supply voltage impressed on the discharge tube itself to be extremely small, and, consequently, the discharge tube to be extinguished immediately together with the extinction of the ignition pulse. Furthermore, it is necessary to select a small value of the time constant of the oscillation current circuit so that the oscillation current generated in the resonance circuit will also decay rapidly together with the decay of the ignition pulse. If these measures are taken, the discharge tube will be extinguished immediately together with the decay of the ignition pulse even if the anode voltage does not become zero. That is, if, when the anode of the discharge tube 2 is under the positive potential of the alternating current power source, an ignition pulse $P_1$ as shown in FIG. 4(B) is applied on the grid $G_1$, the discharge tube 2 will ignite, and an oscillation current having a frequency $fo$ will be generated. However, together with this, the voltage drop in the retardation coil 6 will become large, and the voltage applied on the discharge tube 2 will be almost zero. Therefore, even if the alternating-current power source voltage does not become zero, the discharge tube will be extinguished immediately together with the extinction of the ignition pulse, and the oscillation current will also decay rapidly since the time constant of its circuit is small.

Then, since the positive power-source voltage of the same half cycle is again impressed on the discharge tube 2, the above-described operation is caused to be repeated by applying a second pulse $P_2$ on the grid $G_1$, whereby a second oscillation current is generated. By further applying a third ignition pulse $P_3$, a third oscillation current can be generated. Thus, the operation becomes extremely efficient.

In the foregoing case, although the efficiency increases with increase, to a certain extent, of the number of ignition pulses, such factors as the time from the ignition of the discharge tube to its extinction and the duration time of the oscillation current, or the magnitude of the instantaneous value of the power-source voltage, should be considered well in the selection of the said number of ignition pulses.

An application of the present invention to a three-phase power source is indicated by the connection diagram of FIG. 2. The operation and effectiveness of this embodiment can be easily understood by reference to FIG. 1.

It will be obvious that when the intermediate-frequency power generating apparatus of this invention is used as an induction heating power source, its induction heating coil can, of course, be utilized as the induction coil of the parallel resonance circuit.

The circuit of FIG. 3(A) consists of an alternating power source S, a pulse transformer T, a rectifier R the input side of which is connected to the output side of said transformer T, resistors $R_1$ and $R_2$, a battery B, and an output condenser $C_1$. Both terminals of the said condenser $C_1$ are connected, respectively to the control grids and cathodes of the discharge tubes of the circuit of FIG. 1 or FIG. 2. Similarly, the circuit of FIG. 4(A) consists of a three phase alternating power source $Sa$, a three phase pulse transformer $Ta$, a rectifier $Ra$ the input side of which is connected to the output side of said transformer $Ta$, resistors $R_{1a}$ and $R_{2a}$, a battery $Ba$, and an output condenser $C_{1a}$. Both terminals of the condenser $C_{1a}$ are connected, respectively, to the control grids and cathodes of the discharge tubes of the circuit of FIG. 1.

In embodying this invention, when a polyphase ignition pulse generating circuit is necessary to operate the polyphase circuit such as, for example, shown in FIG. 2, it is only necessary to use a polyphase ignition pulse generating circuit formed by connecting a plurality of single-phase circuits such as shown in FIG. 3(A) or FIG. 4(A) in a polyphase system the phase number of which is equal to that of the polyphase circuit to be operated.

In order to indicate still more fully the nature of the present invention, the following example of a typical, practical application thereof is set forth. It being understood that this example is presented as illustrative only, and that it is not intended to limit the scope of the invention.

*Example*

In the circuit shown in FIG. 1, a retardation coil 6 of 10 henries inductance, capacitors 7 and 5 of 1.4 microfarads capacitance each, and 7G57 thyratrons for the discharge tubes 2 and 3 were used. By applying a load of 4 kilovolts, 4 amperes at 50 cycles per second on the alternating-current power source 1, a heating power of 10 kilowatts at 3 kilocycles was obtained.

In the above example, an oscillation current was caused to be generated once in a half cycle of the alternating-current power source. When, as a modification, an oscillation current was generated three times in a half cycle, the same heating power as above-stated was obtained with a load of 3 kilovolts, 4.5 amperes on the power source 1.

Although this invention has been described with respect to particular embodiments thereof, it is not to be so limited as changes and modifications may be made therein which are within the full intended scope of the invention, as defined by the appended claims.

What is claimed is:

1. An intermediate-frequency electric power generating apparatus comprising, at least one pair of gas-filled discharge tubes reversely connected, a resonant circuit connected in parallel with said tubes, a source of alternating voltage connected to apply said voltage to said tubes simultaneously, means to render said tubes conductive during only a one-half cycle of the alternating voltage applied to said tubes comprising pulse generating means connected to repetitively apply at least one pulse to said tubes only during one-half cycle of said alternating voltage to render said tubes conductive to pass current theerthrough alternately to flow an oscillating current through said resonant circuit, each of said tubes having a control grid to which pulses generated by said pulse generating means are applied, a capacitor connected between said resonant circuit and said tubes, and a coil connected between said source of alternating voltage and said tubes to suppress flowing of said oscillation current through said alternating voltage source.

2. An intermediate-frequency electric power generating apparatus comprising, a plurality of gas-filled discharge tubes reversely connected in pairs, a resonant circuit connected in parallel with said tubes, a source of alternating voltage connected to apply said voltage to said tubes simultaneously, means to render said tubes conductive during only a one-half cycle of the alternating voltage applied to said tubes, comprising pulse generating means connected in parallel with said tubes, a source of alterntt- only during one-half cycle of said alternating voltage to render said tubes conductive to pass current therethrough to said tubes, comprising pulses generating means conalternately to flow an oscillating current through said resonant circuit, a capacitor connected between said resonant circuit and said tubes, and a coil connected between said source of alternating voltage and said tubes to suppress flowing of said oscillation current through said alternating voltage source.

(References on following page)

References Cited by the Examiner

UNITED STATES PATENTS

| | | | |
|---|---|---|---|
| 2,351,439 | 6/1944 | Livingston | 328—81 |
| 2,481,132 | 9/1949 | Lissman | 321—66 |
| 2,521,880 | 9/1950 | Storm | 331—62 |
| 2,727,142 | 12/1955 | Stanton | 328—81 |
| 2,728,886 | 12/1955 | Rohats | 328—81 |
| 2,897,352 | 7/1959 | Smith-Vaniz | 331—81 |
| 3,119,972 | 1/1964 | Fischman | 331—113.1 |

JOHN F. COUCH, *Primary Examiner.*

ROY LAKE, LLOYD McCOLLUM, *Examiners.*

G. GOLDBERG, *Assistant Examiner.*